United States Patent Office 2,930,677
Patented Mar. 29, 1960

2,930,677

METHOD OF HANDLING LIQUORS CONTAINING SCALE FORMING COMPOUNDS

William F. Van Loenen, Baton Rouge, La., assignor to Kaiser Aluminum & Chemical Corporation, Oakland, Calif., a corporation of Delaware No Drawing. Application January 31, 1955
Serial No. 485,323

6 Claims. (Cl. 23—143)

The herein described invention relates to a method and apparatus for handling alkaline aluminate solutions and more particularly caustic solutions associated with alkaline processes for the recovery of alumina from bauxites and other aluminous materials. The invention furthermore relates to a method of applying thermoplastic materials to base surfaces so that a strong adherent bond is developed between the base surface and thermoplastic material. Still further, the invention relates to a method of reducing adherence of scales such as alumina trihydrate and complex sodium aluminum silicates to the walls of process vessels and conduits employed in the treatment of bauxites and other aluminous materials according to alkaline type alumina refining processes.

It is an object of the invention to provide a method for treating the walls of vessels which are used in alkaline processes for making alumina so as to considerably decrease the adherence of scale which deposits on said walls.

It is a further object of the invention to provide a method of handling Bayer caustic aluminate liquors in a manner such as to considerably decrease the adherence of the scales thereof to the walls of the vessels employed therefor.

It is a further object to provide a method of handling a caustic aluminate solution such as found in alkaline processes for producing alumina so as to decrease the adherence of scale to the walls of the vessels employed therefor.

It is a further object to provide resinous coatings in combination with the walls of process vessels and conduits employed for handling liquids containing scale forming compounds of the sodium aluminum silicate complex and alumina trihydrate types.

It is a further object to provide resinous coatings for process vessels handling alkaline solutions containing scale forming compounds of the sodium aluminum silicate complex and alumina trihydrate types characterized by the fact that said coatings exhibit a reduced tenacity for the scale deposits as compared to the tenacity exhibited by said scales for the uncoated surface of the vessels and said coatings furthermore exhibiting a greater tenacity for the metallic surface than for the scale formations.

It is a further object to provide a more effective and less costly means for handling liquids containing scale forming compounds of the alumina trihydrate and sodium aluminum silicate types.

It is a further object to provide a method for applying preformed sheet thermoplastic to a base material.

It is a further object to provide a method for applying preformed sheet thermoplastic material to a metal or other type base utilizing hot techniques therefor.

It is a further object to provide a method for applying thermoplastic material to a base in a manner so as to develop a strong bond between the thermoplastic material and said base.

It is a further object to provide a method for obtaining a glossy or smooth surface on thermoplastic coatings.

As is apparent to those skilled in the art of alkaline alumina refining operations, one of the major cost items associated therewith is attributed to the scale deposits which form on the walls of the tanks, pipes and processing equipment associated therewith. It is apparent that any method developed which can substantially minimize the cost of refining attributed to the removing of these scale deposits is highly desirable. Although most particular attention will be given herein to the problem as found in the Bayer type alumina refining process, it will be apparent that the scope of the invention is nevertheless not limited thereto.

In general, there are two types of scale formations which take place in the alkaline processes for producing alumina as, for example, the Bayer process which is most universally used in modern practice. One of the undesirable scale formations is the well known desilication product, a complex sodium aluminum silicate salt resulting from the caustic attack on the soluble siliceous material usually contained in the ore. The second scale formation which materially increases the operating cost in an alkaline process is the alumina trihydrate scale formations which likewise adhere rigidly to the walls of the processing vessels.

The scale formations of the sodium aluminum silicate complex salts are the direct result of the dissolution of caustic soluble silica during the digestion phase of the Bayer process wherein the aluminous values are simultaneously dissolved to form a pregnant caustic aluminate solution containing the dissolved alumina values. The dissolved silica values apparently react with the soda and alumina values in varying proportions to produce the insoluble sodium aluminum silicate salts commonly referred to in the art as "products of desilication" or "desilication products." A substantial amount of the desilication product forms on the walls of the digestion apparatus during the digestion phase per se as well as subsequently during the clarification phase of the Bayer process. As is well known to those skilled in the alumina refining arts, the caustic liquors associated with the Bayer process contain dissolved silica in varying amounts throughout the continuous process and the complex sodium aluminum silicates deposit therefrom continuously in amounts depending upon the particular condition of the liquor including the amounts of silica dissolved therein. In general, however, the greatest amount of deposited scale formations which require the most frequent attention are found on the walls of the vessels and the equipment in the digestion and clarification phases. It is apparent, of course, that the spent liquor lines and spent liquor tanks similarly require periodic attention in order to remove the scale deposits, although less frequently than the equipment associated with the phases of the Bayer process referred to above.

Because of the very nature of the Bayer process, which is based on the different solubilities of alumina in caustic liquors under different operating conditions, the alumina trihydrate readily deposits as scale formations in many phases of the process due to the changing conditions thereof. This becomes, consequently, one of the most aggravating problems associated with alumina refining operations. The caustic liquors are supersaturated under normal operating conditions subsequent to the digestion stages of the process and accordingly, tend to deposit alumina trihydrate on exposed surface areas which apparently provide nuclei for accelerating the decomposition of the pregnant solutions. Therefore, in the clarification and the precipitation phases of the Bayer process wherein the caustic aluminate liquors are supersaturated, there is ever present the menacing alumina trihydrate scale formations which require periodic removal in order to maintain equipment capacity as well as efficient operation thereof. During the clarification phase of the process the scale formations are principally a mixture of sodium aluminum silicate complexes and the alumina trihydrate; whereas, the scale formations which take place during the precipitation operations are predominantly alumina trihydrate, comparatively no desilication scale formations taking place in this latter mentioned unit operation.

The usual method of removing the scale formations, both sodium aluminum silicate and alumina trihydrate types, is by chipping the scale from the vessel walls by means of air hammers and other mechanical means. It is apparent that such methods for scale removal are expensive and that a method of retarding the scale formations or reducing the adherence thereof to the walls of the processing vessels and pipe lines associated therewith is highly desirable.

According to one phase of the invention, it has been discovered that the manner in which these deleterious scales adhere to the walls of the processing vessels and conduits associated therewith can be effectively controlled by applying to the liquid contacted portions thereof resinous materials either of the thermosetting or thermoplastic type. It is understood that the above-mentioned term "resinous materials" applies either to resinous coatings or sheet materials. Thus, coatings would apply to resinous materials applied to the surface in any manner such as spraying or brushing methods and the sheet materials would apply to separate sections of resinous materials which are applied to the surfaces of a vessel. It can then be seen that after the resinous coatings or sheets are applied, it is not ascertainable as to how the resinous material was placed thereon. Therefore, the scope of the term "resinous materials" applies to coatings and also to sheet materials as referred to in the appended claims. Consequently, it has been discovered that the scale formations heretofore referred to have a reduced tenacity toward resinous materials on the metal surfaces of the processing equipment as compared to the metal surfaces of the equipment per se. As a direct result of this discovery, descaling operations, i.e. the removal of the scale formations from the walls of the vessels and the conduits, have been greatly facilitated in actual alumina refining operations. For example, it has been found that the scale formations can be removed from the resinous materials in many cases by merely tapping the scale formations with a hammer or other instrument as compared to the necessity heretofore of using air hammers and other more violent means. In some cases, it has been discovered that the scale formations tend to release automatically from a resinous coating after building up to a point where the weight thereof is adequate to overcome the adhesion of scale to the resinous coating.

Obviously, the resinous material must be suitably chosen so as to withstand the caustic conditions of the liquors contacting them and furthermore, the resinous coating must be chosen so as to withstand the particular temperature conditions which prevail at the particular place of application. But for this obvious limitation, we have yet to find a thermoplastic or thermosetting resinous coating which does not exhibit a reduced tenacity for the aforementioned scale formations as deposited from a Bayer type process as compared to the tenacity exhibited by the steel walls of the processing vessels for the scale formations. Although the invention will be described with particularity hereinafter with reference to the processing vessel walls such as tanks, it will be apparent that the invention applies with equal emphasis to conduits and other apparatus utilized for carrying out the various unit operations in alkaline alumina refining operations.

One type of thermosetting resinous material which has been discovered to be effective in reducing scale adherence is a condensation product of an epoxide with a polynuclear phenol, more specifically the condensation product of epichlorhydrin with bis-phenol. This particular type thermosetting resinous material is known commercially as "Epon." It may be applied to the metal walls of the vessels according to any of the conventional methods well known to those skilled in the art of resinous coatings so long as the technique permits the development of a greater bond between the thermosetting resin and the tank walls than the bond developed between the adherent scale formations and the resinous coatings. For example, the conventional spraying, brushing or roll coating techniques may be employed wherein the resinous material as dissolved in a suitable solvent and usually together with an appropriate catalyst is applied to the metal surface and polymerized thereon to the insoluble infusible state. Polymerization may be accomplished cold or may be speeded up by application of heat. Other suitable methods for applying thermosetting resinous materials are also well known and accordingly, the invention insofar as the particular method of application is concerned is not to be construed as limiting the scope of the invention in any manner. As is obvious, the method or technique of applying the resinous thermosetting material to the vessels must be chosen as a practical matter so as to give a greater bonding strength between the thermosetting resin and the metal base than that between the scale and the resin. In this regard, the conventional techniques have been found almost universally adequate and satisfactory for accomplishing this result.

Although the scale formations deposited from the caustic liquors of the Bayer alumina refining process have been found to be less adherent to thermosetting resinous coatings than to the base metal per se, it has been ascertained that the greatest amount of non-adherence is developed when the resinous coating exhibits a smooth substantially nonporous face or surface to the alkaline liquors. Such a surface contains relatively few pocks or indentations which afford a foothold from which crystal growth can develop. Glossy finishes are preferable although the principal criterion for the greatest effectiveness stems apparently from the smooth and nonporous nature of the surface. Techniques for the development of this type finish are well known to those skilled in the art of thermosetting resinous application methods.

Thermoplastic resins such as polytetrafluoroethylene, polyethylene and similar resins have also been found suitable for the applications embodied within the scope of the invention in that they exhibit the desired property of having a reduced tenacity toward the scale formations as compared to the tenacity exhibited by the scale formations to the metal surfaces of the processing vessels.

Similarly, the conventional techniques well known to those skilled in the art of applying thermoplastic resinous materials may be utilized so long as the technique provides a thermoplastic resinous application having a greater adhesive strength to the base than that exhibited by the scale formations for the resinous material. Thus, for example, molten spray techniques may be employed as well as methods which may be directed to the in situ polymerization of the plastic on the surface of the metal. For example, "Teflon," a commercial form of polytetrafluoroethylene may be sprayed onto the surface to be coated, the composition being such that polymerization occurs after a preliminary air drying operation. Thereafter, a high temperature (about 750° F.) direct flame application or heat treatment is normally used to obtain the final desired state of polymerization. Polyethylene protective coatings are applied usually by the molten spray techniques.

Like the thermosetting resinous plastic materials the thermoplastics also exhibit a decreased adherency to scale formations when the surface presented thereto is smooth and substantially nonporous. A glossy surface and/or a smooth substantially nonporous surface have been found to contribute appreciably to the decreased adhesive-strength of the scale to the walls of the processing vessels per se.

In general, the techniques to obtain a smooth substantially nonporous surface on thermoplastic resins are well known. However, as a distinct and separate feature of the herein described invention a new and novel method is set forth for obtaining a smooth substantially nonporous surface on an already applied thermoplastic resin. This method essentially comprises in the preferred form placing a piece of metallic foil such as aluminum foil over the applied thermoplastic resinous material. Thereafter by means of a heated surface such as heated roll or household type flat iron working the foil onto the exposed surface of the thermoplastic coating. By carefully working out the air bubbles between the foil and the resinous surface and causing the foil to adhere to the surface of the thermoplastic coating, a surface on the resin will be obtained after subsequent peeling off of the foil that is substantially as smooth as the applied face of the foil itself. Obviously, where desirable, the foil backing can be removed subsequently by suitable solvents therefor such as by dissolving in caustic when the foil is aluminum for example.

In general, according to this technique of developing a smooth surface on an applied thermoplastic resin, the temperature of the heated tool should be somewhat above the normal temperature for fusion of the thermoplastic yet below that point where damage will be caused thereto. In any event, it is apparent that the purpose thereof is to plasticize or melt a thin film on the surface of the applied resin so as to impress the foil thereon. The foil further serves to prevent any adherency between the thermoplastic material and the tool such as is frequently encountered in hot type application methods.

Although foil such as aluminum foil has been used with greatest success in obtaining the smooth substantially nonporous surface, it is apparent that other suitable stable membrane backings may be employed for this purpose as long as the backing presents a smooth surface to the thermoplastic material such that said surface will be impressed in effect upon the surface of the resinous material. For example, a smooth paper may be utilized. Obviously, the material applied for making the impression must be stable under the temperature conditions during the application.

In addition to the above referred to methods of applying thermoplastic material to a metal base of, for example, the Bayer type processing vessels, it has been ascertained that preformed sheet thermoplastic materials may also be applied in a manner that develops an adequate bonding strength between the resin and the base. Obviously, any method of application for use with sheet material may be employed as long as an adequate bond is developed with the base which is in excess of the bonding strength between the scale and the thermoplastic material. However, the method of applying preformed polyethylene sheet material hereinafter described is particularly desirable.

At this point it may be stated that, in general, attempts at applying polyethylene type resinous materials in sheet form to tank walls have been relatively unsuccessful as far as large commercial operations are concerned. Thus, adhesives or cements have not been developed which provide a suitably adequate bond between the preformed sheet and the metal surface such as desired for large commercial applications. Furthermore, the hot methods of applying the sheet material with adhesives have been unsuccessful in general for lack of a proper method of application which prevents shrinkage and ultimate withdrawal of the plastic material from the surface of the tank walls after and/or during cooling. In fact, the polyethylene sheet application methods have been so unsuccessful that the method of using the material for tank linings has been more or less limited commercially to the insertion of the polyethylene into tanks as prefabricated bag type formations. In this manner the prefabricated bag forms the continuous lining for the particular tank.

Thus, another phase of the herein described invention is directed to applying thermoplastic resinous sheet material to base materials as, for example, the metal surfaces of tanks, conduits and other processing equipment in a new and novel manner. Although the method will be described most particularly with reference to polyethylene type thermoplastic resinous materials and their application to metal surfaces such as steel tanks, it will become apparent to those skilled in the art that the technique is not limited thereto but may be utilized with equal facility with other thermoplastic resinous materials and with applications of these different types of thermoplastic sheets to various different type base substances.

According to this phase of the herein described invention resinous materials of the sheet polyethylene type can be applied to a base surface such as a steel tank surface in a manner which develops a superior bonding strength between the resinous material and the metal surface than that developed between the scale formations and the resinous materials. Similarly, the hereinafter described method for the application of sheet material has been found to develop a superior bond between the polyethylene sheet and the metal surface than other tested preformed sheet bonding technique. Accordingly, the method for applying sheet thermoplastic material to bases is not to be limited thereto.

In general, it has been found that a superior bond is developed by merely applying preformed sheet polyethylene material to a previously cleaned and preheated base and working the sheet onto the surface thereof with a suitable surface applicator. Preferably, the sheet material has a stable membrane backing although this phase of the invention is not to be construed as limiting the basic application method for the development of a superior bond to the utilization of membrane backed material. Hot techniques heretofore known for applying preformed polyethylene sheet to a base have almost invariably utilized a tool such as a roller or some type of a surface applicator for working the sheets onto the previously cleaned and preheated base and furthermore necessitated an adhesive for the development of a reasonable bonding strength. In general, the thinness of the polyethylene sheet used, when it is applied according to the hot techniques, is limited so that the exposed surface of the sheet does not become excessively plastic during the actual application thereof to the metal base. If the exposed surface becomes plastic and tacky from the action of the heat which penetrates through the material from the base walls, the thermoplastic material sticks to the rollers or other surface applicating tool and/or generally interferes with the effectiveness of its use. Attempts have been made to overcome this by utilizing wetted rolls so as to cause a surface cooling effect on the exposed polyethylene sheet during the application operation. However, these methods of overcoming the problem have been relatively unsuccessful and in particular when thin sheet material is employed. Consequently, it has generally been necessary to make applications of polyethylene sheet by utilizing thick sheets in conjunction with some type of adhesive in order to avoid the undesirable plasticity of the tooling surface and to obtain a reasonable bond. Resort to thicker sheets for hot applications has been similarly unsuccessful for most uses since the polyethylene upon cooling tends to shrink and thereby draw away from the base surface.

Generally, it has been found that a bond superior to that developed by hot techniques employed with adhesive can be obtained by the direct application of the sheet polyethylene to the preheated base surface or by melting a thin film of resin on the surface of the material being applied and thereafter working the sheet onto the base. Thus, it has been discovered that a strong bond can be developed between the base and the preformed polyethylene sheet applied thereto by utilizing hot technique methods alone, without the co-usage of adhesives. Preferably, a stable membrane backing on the resinous polyethylene sheet during the application thereof to the heated base is employed to overcome the disadvantages associated with the tackiness developed. Thus, as a separate feature of the hereindescribed invention a novel method has been developed to overcome the serious limitations of prior hot technique methods for working the sheet material onto the surface of the base.

"Stable membrane backing" as herein used refers to a thin flexible sheet like backing for the polyethylene such as a metal foil, a paper sheet, cloth or other similar materials which generally retain their form and shape without effectively deteriorating during the application of the thermoplastic sheet material to the base surface. In the preferred method of carrying out this phase of the invention the backing is considered to be an initially adherent backing as distinguished from one of the hereinafter described species of the developed method wherein the membrane backing is applied to the resinous material simultaneous to the application thereof to the base material. Still further, it is preferable to employ a nonporous stable backing such as aluminum foil although the porosity of the backing primarily depends on the plasticity of the resin developed during the actual application immediately adjacent to the membrane. As will be furthermore apparent aluminum foil or foil type materials are preferably used as a membrane backing since on subsequent removal the desired smooth and nonporous surface is presented. In general, the limitations on the type backing and its porosity will be readily apparent to those skilled in the art.

According to the preferred method of applying the polyethylene sheet material to a base, the cleaned base is preheated to a temperature above the point where the polyethylene material becomes plastic and below the charring point thereof. Generally about 50° F. above the initial melting point has been found adequate although somewhat higher temperatures are employable having regard for the deterioration of the material which develops at excessive temperatures. The preformed stable membrane backed polyethylene sheet material is then placed on the surface of the preheated base so that the resin side of the sheet material is contacting same. Immediately thereafter, the sheet material is worked onto the surface of the base by means of a suitable applicator such as a roller so that the air bubbles are worked out along the sides thereof. It will be found upon cooling that an adherent bond has been obtained superior to those normally obtained by similar hot techniques where adhesives are utilized. In general, it has been discovered that varying thicknesses of polyethylene sheet material may be applied to the surfaces of metallic bases. For example, it has been found that a sheet of polyethylene 1½ mils thick can be effectively placed upon a steel base according to this technique. Similar results have also been obtained by utilizing sheet material in excess of ⅛ inch.

In order to develop the most effective bonding strength, it is obviously preferable to previously clean the surface of the base. For example, sand blasting or solvent cleaning methods may be employed.

In general, the surface applicator may be a "hot" or "cold" tool although the latter is preferred for thin sheet applications since the heat from the base is usually adequate to facilitate the application operation. It sometimes has been found advantageous to utilize a heated tool such as a hot roll or apparatus similar to the common household flat iron for working the material onto the surface of the base. "Hot techniques" as used herein with reference to sheet application methods is utilized as referring to applications of sheet material wherein the thermoplastic is applied to a base in a manner such as to fuse at least the face of the sheet being applied to the base so that a fluid surface is presented to said base during the tooling operation. Although the usual method is to heat the base, it is apparent that heating the surface of the sheet material per se on the surface thereof to be applied to the base may also be employed alone or in conjunction with base heating. Similarly, the employment of a hot tool can be utilized as a means for developing the desired plasticity to accomplish the end result.

The use of foil for assisting in the butt welding of adjacent sheet material may also be employed. Thus, foil can be placed over the applied adjacent sheet portions at the welding points and a hot tool employed for raising the temperature of the thermoplastic to the point where the adjacent sheets fuse together. Stripping of the foil thereafter will disclose that the method is superior to other fusion methods for butt welding thermoplastic materials.

It may be mentioned that when thin sheets are being applied to tank type surfaces the method has been found to greatly facilitate the operation. In this regard, it has been found that a technique similar to the hanging of wall paper can be used. The membrane backed thermoplastic is applied at the top of the tank from a roll of foil backed polyethylene and the application made downwardly employing heated air on the surface to be treated and working the material onto the base by means of a suitable surface application. In this regard, a brush has frequently been found adequate for working the polyethylene onto the surface of the base, the membrane backing preventing interference from the plastic nature of the sheet material when heated.

Although the preferred resinous sheet application method described herein calls for employing an initially adherent stable membrane backed resinous thermoplastic sheet material, it will become immediately apparent that the membrane may be utilized separately in the operation as a stable backing. Thus, to the cleaned preheated metal base a sheet of polyethylene may be first applied and a piece of aluminum foil thereafter placed on top thereof. This would thereafter be followed by the tooling of the surface so as to work the polyethylene onto the surface of the metal. A hot surface applicator such as a heated flat iron or roller is preferred for this type of application although the invention is not specifically limited thereto.

Aluminum foil is preferred as the backing for the polyethylene sheet material during the application thereof especially where the material is to be used in tank applications such as to afford a less adherent surface for alumina trihydrate and sodium aluminum silicate complex scale formations. The foil serves to impress upon the polyethylene a smooth substantially nonporous surface which is highly advantageous as regards the minimization of the scale adherence thereto. The foil serves primarily two functions during the application to the tank walls, namely, first, as a support for the polyethylene when sections thereof are being applied to thus prevent slipping of the polyethylene material at localized overheated sections of the base material, and secondly, the foil prevents direct contact of the surface applicator (tool) with the polyethylene, thereby avoiding the tacky nature of the surface.

It is apparent that the method of applying sheet thermoplastic materials herein described is not limited to the application of one sheet to the surface of a base but rather that the invention and method thereof may be carried out when laminated sections are desired. Thus, after the initial sheet has been placed on the base and the membrane removed, additional sheets of membrane backed resinous material may be worked onto the surface of the first adhering sheet or other methods may be employed for building up the surface of the resinous material thereon. Consequently, laminated sections of polyethylene may be applied to the surface of tanks by either applying additional sheet material or by utilizing such methods as the molten spray techniques.

Similarly, it will be apparent that, although the invention has been described without the use of adhesives, the full generic scope of this phase of the invention embodies the application of stable membrane backed thermoplastic materials to tank walls and other type bases wherein adhesives are also employed for developing an adherent bond.

Although a foil backing is preferred according to the invention, a paper, cloth or similar material may be employed in the process to facilitate the application of the thermoplastic material. The paper serves a similar function to that of the foil. Likewise, cloth and similar fabrics may also be employed as a backing for the polyethylene during application, taking into account, of course, the porous nature of the cloth during the heating period of the resin application. In general, the porosity should be such that enables the peeling off of the material from the polyethylene after application thereof to the base.

Depending on the final use, it is obvious that the foil, paper or cloth may be peeled from the surface of the thermoplastic material after application or permitted to dissolve in the liquors of the process to which the applied material is subjected. Solvent methods for removing the backing, of course, may also be employed.

As a specific example of the results to be expected from the use of a thermoplastic material as a coating in Bayer type operations so as to minimize the scale adherence thereto, and in particular polyethylene as applied to a metal base in sheet form, the following example is given:

*Example I*

A clean mild steel plate 6" x 6" was preheated to about 400° F. and a piece of aluminum foil backed sheet polyethylene was placed thereon and worked onto the metal by means of a roller. The thickness of the polyethylene sheet material was .0015 in. This plate was then suspended by means of a suitable connection in a Bayer type precipitator tank with the foil surface retained thereon. (Obviously, the foil dissolved shortly after suspension therein.) The conditions in the precipitator tank were such as are conventionally found in Bayer practice wherein the alumina hydrate is autoprecipitated from caustic aluminate liquor by cooling and seeding with previously precipitated hydrate.

After three weeks of continual Bayer plant batch type precipitation, the plate was examined. It was found that, in general, there was substantially no scale adhering to the polyethylene. A few fine powdery scale portions were observed which were easily removed by brushing with the fingers.

The following examples further exhibit the nonadherent nature of both thermoplastic and thermosetting resinous materials when exposed to the conditions therein mentioned in actual Bayer operations wherein the alumina trihydrate and sodium aluminum silicate scale formations previously discussed deposit.

*Example II*

A piece of sheet Teflon, polytetrafluoroethylene, .015 inches thick was clamped on a backing plate of 10 gauge stainless steel. Two strips of mild steel together with the Teflon plate were bolted to an assembly which was thereafter suspended in a precipitator tank for observation of the scale forming properties thereon. At the end of the first precipitation cycle tiny crystals of alumina trihydrate stuck lightly to the surface yet could easily be brushed off or rubbed off with the fingers.

Leaving the assembly suspended in the liquor for four precipitation cycles gave sufficient time for a coating to bridge solidly over both the metal and the Teflon surfaces. However, the scale could be removed with the fingers from the Teflon but not from the metal parts. The bridgement of the scale was attributed to initial deposition of scale on the metal and growth over the surface of the Teflon. In any event, the adherence thereof to the Teflon was negligible compared to the adherence to the mild steel.

*Example III*

One deck of a plural deck mud settler having 4 decks operated in a Bayer type process for clarification purposes was cleaned by sand blasting and three coats of an "Epon" type resin applied to the walls thereof as well as to the rake mechanism. At the end of a 63 day cycle of continued exposure to scaling conditions in the actual clarification phase of a Bayer type process it was found that the side walls and rakes could be cleaned by merely using a water jet from a hose. It was estimated that 120 man hours were saved on the first operating period of 63 days, 120 man hours on the second operating period of 64 days, 90 man hours on the third operating period of 57 days and 60 man hours were saved in the fourth operating period of 35 days. A total of 390 man hours were saved from four cycles of operation covering a seven month period. Multiplying by 4, there would have been a saving of 1560 man hours, had the entire unit been coated. The average time required to descale a mud washer, not protective coated, is 750 man hours per operating cycle. The above example represents 4 cycles normally requiring 3000 man hours for descaling. Thus, a saving of 52% in man hours is indicated.

Obviously, the reduction in down time of the equipment gave an increase in time of productivity. On a full scale operation of one settler, this time is estimated at 4 days for each operating cycle. Although the adherency of the scale formations to the walls increases with time, nevertheless this was attributed to exposed metal portions wherein the bond of resin to the wall was originally defective or where the resin had been removed therefrom. At no time has it been found that the adherence of the scale to the resin is as great as the adherence of the scale to the metal walls per se. Thus at the end of three cycles heretofore mentioned the scale was easily removed by merely striking the scale with a sledge hammer whereupon large sections fell therefrom. Again the adherency to the walls was primarily the result of the exposed metal surfaces. Previous cleaning techniques have required constant chipping with air hammers and similar equipment to accomplish the same result in a less efficient manner.

*Example IV*

A filter of the Kelly filter type also employed in clarification operations was coated on the inside with an "Epon" coating, a polynuclear condensation product of bis-phenol and epichlorohydrin, and subjected to normal conditions found in filtration operations in Bayer plant practice. It was found that even at the end of about fifteen cycles the scale formations on the inside walls of the Kelly filters could be removed by mere hosing operations. Again this is to be contrasted with the methods heretofore employed of utilizing jack hammers for the scale removal operation.

It is apparent from the invention herein described that resinous materials afford a surface to which the alkaline alumina refining scales heretofore mentioned have a decreased adherency as compared to the adherency thereof to metal surfaces. Manifestly, a new method has been devised for applying sheet thermoplastic material, especially polyethylene, to base surfaces so as to develop a good bond therewith without the necessity for using adhesives. Similary, a patentably new method has been devised for applying sheet resinous thermoplastic materials to a base so as to overcome prior problems associated with the tacky nature thereof upon heating as well as those associaed with general application thereof to surfaces.

What is claimed is:

1. In the wet caustic aluminate process for producing alumina from aluminous ores wherein a hard, tenacious, crystalline scale is normally deposited from caustic aluminate liquor on the metal surfaces of process equipment and the deposited scale is periodically removed from the said surfaces, the improvement which comprises operating said process in process equipment containing caustic-resistant resinous coatings on the metal surfaces thereof, whereby the adherency and tenacity of said scale deposits are substantially reduced and said periodic removal of scale deposits is facilitated.

2. The process of claim 1 wherein said resinous coating is a thermoplastic resinous material.

3. The process of claim 1 wherein said resinous coating is a polyethylene resinous material.

4. The process of claim 1 wherein said resinous coating is a polyfluoroethylene resinous material.

5. The process of claim 1 wherein said resinous coating is a thermosetting resinous material.

6. The process of claim 1 wherein said resinous coating is a condensation product of epichlorohydrin with bis-phenol.

References Cited in the file of this patent

UNITED STATES PATENTS

| | | |
|---|---|---|
| 2,379,500 | Steffens | July 3, 1945 |
| 2,406,039 | Roedel | Aug. 20, 1946 |
| 2,455,114 | Cobb | Nov. 30, 1948 |
| 2,551,591 | Foord | May 8, 1951 |
| 2,569,954 | Ruebensaal | Oct. 2, 1951 |
| 2,571,604 | Payzant | Oct. 16, 1951 |
| 2,643,239 | Shokal | June 23, 1953 |
| 2,666,719 | Lissant | Jan. 19, 1954 |
| 2,689,834 | McNabb | Sept. 21, 1954 |
| 2,695,246 | Jurgensen et al. | Nov. 23, 1954 |
| 2,699,413 | Seagren et al. | Jan. 11, 1955 |
| 2,703,765 | Osdal | Mar. 8, 1955 |
| 2,710,266 | Hochberg | June 7, 1955 |
| 2,724,672 | Rubin | Nov. 22, 1955 |
| 2,777,783 | Welch | Jan. 15, 1957 |

FOREIGN PATENTS

| | | |
|---|---|---|
| 480,834 | Italy | Apr. 23, 1953 |

OTHER REFERENCES

Ind. and Eng. Chemistry, volume 47, No. 9, September 1955, pp. 1672–1680.

Chemical Engineering, November 1949, "Line Tanks With Teflon."